(12) United States Patent
Kitamura et al.

(10) Patent No.: US 6,841,215 B2
(45) Date of Patent: Jan. 11, 2005

(54) HEAT RESISTANT PIPE AND METHOD OF MANUFACTURE THEREOF

(75) Inventors: Takuro Kitamura, Moka (JP); Shigeru Kurioka, Ichikawa (JP); Masaru Sato, Utsunomiya (JP)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 10/227,590

(22) Filed: Aug. 23, 2002

(65) Prior Publication Data

US 2003/0100677 A1 May 29, 2003

(30) Foreign Application Priority Data

Sep. 5, 2001 (JP) ........................................ 2001-269472

(51) Int. Cl.⁷ .......................... B29D 23/00; C08L 71/13
(52) U.S. Cl. ....................... 428/36.9; 525/132; 525/133
(58) Field of Search ........................ 428/36.9; 525/132, 525/133

(56) References Cited

U.S. PATENT DOCUMENTS

| 3,383,435 A | | 5/1968 | Cizek | |
|---|---|---|---|---|
| 4,647,613 A | * | 3/1987 | Jadamus et al. | ............ 524/504 |

FOREIGN PATENT DOCUMENTS

| EP | 0 442 102 A | 8/1991 |
|---|---|---|
| EP | 0816435 A | 7/1998 |
| JP | 06157897 A | 7/1994 |
| JP | 8-276549 | 10/1996 |
| JP | 2000281893 A | 10/2000 |

OTHER PUBLICATIONS esp@cenet Abstract of JP8276549.

* cited by examiner

*Primary Examiner*—Jeffrey B. Robertson

(57) ABSTRACT

A heat resistant pipe is formed from a composition comprising polyphenylene ether resin and polystyrene resin. Pipes made from this composition possess superior thermal and pressure resistance. Their impact resistance and thermal expansion characteristics permit them to be utilized advantageously in all environments and during all seasons with little risk of failure.

19 Claims, No Drawings

HEAT RESISTANT PIPE AND METHOD OF MANUFACTURE THEREOF

CROSS REFERENCE TO RELATED APPLICATION

This application claims priority to Japanese Patent Application No. JP2001-269472, filed on Sep. 5, 2001, which is incorporated herein in its entirety.

BACKGROUND

This disclosure relates to heat resistant pipe and a method of manufacture thereof.

Steel piping has traditionally been utilized to carry and transmit water and other fluids. However, steel piping suffers from the drawback that it is heavy and cumbersome. Its large mass generally causes problems during manufacturing processes such as cutting, fitting, and the like. It also renders installation processes cumbersome and expensive due to the large number of personnel required. Steel piping additionally suffers from a lack of chemical stability, which causes rusting. The presence of rust in pipes often gives rise to an unpleasant odor in the water.

In order to overcome these drawbacks, pipes are now made of synthetic thermoplastic resins such as polyvinyl chloride (PVC). While PVC provides significant benefits such as low weight, adequate hardness and impact resistance, it suffers from drawbacks such as the lack of heat and pressure stability. In order to improve heat stability, Patent No. Hei 8-276549 teaches a multilayered fiber reinforced pipe having a first layer formed from fiber-reinforced PVC, a second layer formed from either an acrylic resin or PVC containing a dispersed acrylic rubber and a third layer formed from acrylic resin laminated onto the outside of the first layer. However, differences in thermal expansion between the different layers due to ambient temperature fluctuations often cause them to peel apart. Additionally PVC suffers from a lack of chemical stability, which can give rise to the presence of chlorine, which may be undesirable. Plasticizers utilized in PVC such as phthalic acid ester and nonyl phenol may leach into the soil from embedded pipes, contributing to environmental issues. Thus, despite some of the advantages of PVC over steel, there remains a need for improved low weight, impact resistant and environmentally friendly piping for transmitting water and other fluids.

SUMMARY

A heat resistant pipe is formed from a composition comprising polyphenylene ether resin and polystyrene resin. Pipes made from this composition possess superior thermal and pressure resistance. Their impact resistance and thermal expansion characteristics permit them to be utilized advantageously in all environments and during all seasons with little risk of failure.

DETAILED DESCRIPTION OF PREFERRED EMBODIMENTS

It has been unexpectedly discovered that a composition comprising polyphenylene ether resin and polystyrene resin can be used to advantageously mold pipes for the transmission and distribution of water and other fluids. This pipe offers advantages of being able to transmit water or other fluids at elevated temperatures of 80° C., without undergoing any warpage or distortion. The pipe, because of its high temperature stability, can also be used through day and night during all seasons of the year without risk of damage to its dimensions. Additionally, because of the chemical stability of the molded pipe, the water does not become contaminated with impurities.

The polyphenylene ether resins used in compositions generally comprise a plurality of aryloxy repeating units preferably with at least 50 repeating units of Formula (I)

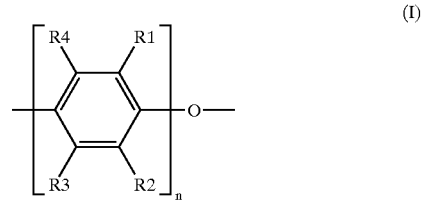

wherein in each of said units independently, each of R1, R2, R3 and R4 are hydrogen, halogen, hydrocarbon radical, substituted hydrocarbon radical, alkoxy radical, cyano radical, phenoxy radical, or nitro radical and n is an integer showing the degree of polymerization. Non-limiting examples of substituents R1, R2, R3 and R4 in the formula (I) above are chlorine, bromine, iodine, methyl, ethyl, propyl, allyl, phenyl, benzyl, methyl benzyl, chloro methyl, bromo methyl, cyano ethyl, cyano, methoxy, ethoxy, phenoxy, nitro and combinations comprising at least one of the foregoing substituents. Suitable but non-limiting examples of polyphenylene ether resins that can be used in the pipe are poly(2,6-dimethyl-1,4-phenylene)ether, poly(2,6-di-ethyl-1,4-phenylene)ether, poly(2-methyl-6-ethyl-1,4-phenylene)ether, poly(2-methyl-6-propyl-1,4-phenylene) ether, poly(2,6-di-propyl-1,4-phenylene)ether, poly(2-ethyl-6-propyl-1,4-phenylene)ether, poly(2,6-di-methoxy-1,4-phenylene)ether, poly(2,6-di-chloromethyl-1,4-phenylene) ether, poly(2,6-di-bromo methyl-1,4-phenylene)ether, poly (2,6-di-phenyl-1,4-phenylene)ether, poly(2,6-di-tolyl-1,4-phenylene)ether, poly(2,6-di-chloro-1,4-phenylene)ether, poly(2,6-di-benzyl-1,4-phenylene)ether, poly(2,5-di-methyl-1,4-phenylene)ether and combinations comprising at least one of the foregoing polyphenylene ether resins. A preferred polyphenylene ether resin is one wherein R1 and R2 in the formula (I) are alkyl radicals having 1 to 4 carbon atoms, R3 and R4 are hydrogen and wherein the degree of polymerization 'n' is about 50.

The polyphenylene ether resin may be either a homopolymer or a copolymer. Suitable copolymers include random copolymers containing 2,6-dimethyl-1,4-phenylene ether units and 2,3,6-trimethyl-1,4-phenylene ether units. Other suitable copolymers are those wherein a styrenic polymer is grafted onto a polyphenylene ether backbone. Examples of styrenic polymers, which can be grafted on to the polyphenylene ether backbone, are polystyrene, α-methyl polystyrene, homopolymers of vinyltoluene, homopolymers of chloro-styrene, and combinations comprising at least one of the foregoing alkenyl aromatics. There is no particular restriction to the viscosity of the polyphenylene ether resin used in the molded pipes, however, a preferred intrinsic viscosity is in an amount of about 0.1 to about 0.5 deciliters/gram (dl/g) when measured in chloroform at 25° C.

The term "polystyrene resin" as used herein includes polymers, which contain at least 25% by weight of structural units derived from a monomer of the formula (II)

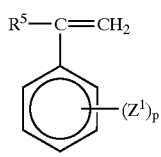

(II)

wherein R5 is a hydrogen or an alkyl radical having from 1 to 4 carbon atoms; $Z^1$ is a halogen or an alkyl having from about 1 to about 4 carbon atoms and p is an integer from 0 to about 5. The polystyrene resins are generally homopolymers of styrene (homo polystyrene) including syndiotactic polystyrene, which has a syndiotactic content of greater than 50 mole % as determined by nuclear magnetic resonance.

Copolymers of styrene may also be used in the pipes. Examples of styrenic monomers that may be copolymerized with styrene to form polystyrene copolymers are p-methyl styrene, α-methyl styrene, α-methyl-p-methyl styrene, chlorostyrene, bromostyrene, and combinations comprising at least one for the foregoing styrenic monomers. Other polymers which may be copolymerized with the polystyrene include polybutadiene, polyisoprene, butyl rubber, ethylene-propylene diene monomer (EPDM), ethylene-propylene copolymer, natural rubber, mixture of natural rubber with epichlorohydrin or a synthetic rubber containing styrene or modified styrene, copolymers of natural rubber with a synthetic elastomer, styrene-acrylonitrile copolymer (SAN), styrene-butadiene copolymer (SBR), styrene-maleic anhydride copolymer, acrylonitrile-butadiene-styrene copolymer (ABS) and combinations comprising at least one of the foregoing polymers. The preferred polystyrene resin is homo polystyrene, syndiotactic polystyrene or rubber reinforced high impact polystyrene.

It is envisioned that recycled polystyrene resin recovered from moldings or from foam can be used in the pipes. The recycled polystyrene resin may contain flame retardant additives if so desired. In addition, the polystyrene resin may be recovered from polystyrene moldings having a surface, which coated or plated with a metal.

The weight average molecular weight of the polystyrene resin used in the pipe is preferably greater than or equal to about 30,000 g/mole, more preferably greater than or equal to about 50,000 g/mole. It is generally desirable to vary the amount of polyphenylene ether resin from about 5 wt % to about 95 wt % based on the total weight of the composition. Similarly, it is generally desirable to vary the polystyrene resin from about 5 wt % to about 95 wt % based on total weight of the composition. A blend of polyphenylene ether resin and polystyrene resin having the above detailed characteristics respectively will display excellent thermal resistance, mechanical strength, flowability, and dimensional stability.

Other additives may optionally be added to the composition. These include at least one type selected from the group consisting of a rubbery impact modifier, fibrous filler, non-fibrous filler, olefinic polymer, alicyclic saturated hydrocarbon resins, higher-grade fatty acid esters, waxes such as low molecular weight polyethylene and montan wax, petroleum variety hydrocarbons, fluoro polymers such as polytetrafluoroethylene, antistatic agents such as sulfonic acid or polyoxyalkylene glycols such as polyethylene glycol or polypropylene glycol, ultraviolet (UV) absorbers such as compounds containing hindered amine group, benzotriazole group, benzophenone group, epoxy group and combinations comprising at least one of the foregoing UV absorbers pigments.

Impact modifiers may also be used in the composition. The impact modifier may be present as a homopolymer or a copolymer. In general it is desirable for the impact modifier to comprise at least one rubbery component having a glass transition temperature of greater than −100° C. and less than 50° C. Examples of such rubbery components are polyisoprene, polybutadiene, polyolefins, polyacrylics, polyesters and the like. The preferred impact modifiers are those, which contain polybutadiene such as styrene-butadiene rubber copolymerized with styrene or hydrogenated styrene.

Impact modifiers comprising three polymers wherein one polymer has as an acid component may also be used. Non-limiting examples are acrylic acid-butadiene-styrene copolymer, carbonic acid-butadiene-styrene copolymer or an acid compound containing carbonic acid anhydride-butadiene-styrene copolymer. Impact modifiers having a rubbery component that comprises polyolefins such as ethylene or propylene can also be used. Copolymers of ethylene and propylene can also be used. Rubbery components such as a polyolefin containing an acid modified component such as butadiene or a reactive epoxy functionality may also be used.

Fibrous fillers having aspect ratios from 2 to 1000 maybe used to impart strength to the composition. Non-limiting examples of such fibers are glass fibers, hollow glass fibers, carbon fibers, hollow carbon fibers, titanium oxide whiskers, and wollastonite. Non-fibrous fillers may also be utilized to impart strength and dimensional stability to the pipe. Such fillers may exist is in the form of platelets, particles which may be crystalline or amorphous. Non-limiting examples of such non-fibrous fillers arc talc, clay, silica, glass flakes, glass beads, hollow filler etc. Combinations of fibrous and non-fibrous fillers may also be used. Impact modifiers may generally be used in the pipe composition in an amount of up to about 7 wt % based on the total weight of the composition.

In addition to being added as impact modifiers, polyolefins may be added to modify the chemical resistance characteristics and mold release characteristics of the composition. Homo polymers such as polyethylene, polypropylene, polybutene can be used either separately or in combination. Polyethylene can be added as high density polyethylene (HDPE), low density polyethylene (LDPE) or branched polyethylene. Polyolefins may also be used in copolymeric form with compounds containing carbonic acid radicals such as maleic acid or citric acid or their anhydrides, acid compounds containing acrylic acid radicals such as acrylic acid ester, and the like, as well as combinations comprising at least one of the foregoing.

Alicyclic, saturated hydrocarbon resins such as those available from hydrogenation of aromatic hydrocarbon resin, for example generally, C9 hydrocarbon resin, C5/C9 hydrocarbon resin, indene-chroman resin, vinyl aromatic resin, terpene-vinyl aromatic resin and the like may also be used. With respect to the terpene variety, terpene resins formed by using α-pinene, β-pinene, and diterpenes as the raw material is preferred. Terpene denatured by aromatic hydrocarbon (phenol, bisphenol A, and the like) or hydrogen-saturated terpenes, and the like are also useful. With regards to the petroleum hydrocarbons, a liquid fraction of petroleum fraction is appropriate for use. Similarly with regards to the aromatic hydrocarbon petroleum resin, aromatic hydrocarbon fraction polymer represented by C9 carbon variety is used. The hydrogen addition ratio is desired to be high, preferably at least about 30%. If the quantity of aromatic component is greater, then desirable properties may be lost.

Thermal stabilizers, which increase the thermal stability of the composition, may also be added. Such compounds include phosphite stabilization agents, epoxy compounds, beta-diketone, inorganic stabilizers such as perchloric acid salts, talc, zeolite and the like, as well as combinations comprising at least one of the foregoing thermal stabilizers. Preferred phosphite stabilization agents are tri alkyl phosphite, alkyl aryl phosphite, tri aryl phosphite and combinations comprising at least one of the foregoing phosphite stabilization agents. Thermal stabilizers may be added in quantities of greater than or equal to about 0.01, preferably greater than or equal to about 0.1 parts by weight based on 100 parts of weight of polyphenylene ether resin and polystyrene resin. It is also generally desirable to add thermal stabilizers in quantities of less than or equal to about 70, preferably less than or equal to about 50 parts by weight based on 100 parts of weight of polyphenylene ether resin and polystyrene resin.

Flame retardants such as phosphorus compounds, silicone compounds, metal salts and combinations comprising at least one of the foregoing flame retardants may also be used. Flame retardants may be added in quantities of about 0.01 to about 50 parts by weight based on 100 parts of weight of polyphenylene ether resin and polystyrene resin. Within this range it is preferable to use an amount of greater than or equal to about 0.1, more preferably greater than or equal to about 3, and most preferably greater than or equal to about 5 parts by weight based on 100 parts of weight of polyphenylene ether resin and polystyrene resin. Within this range, it is also generally desirable to add thermal stabilizers in quantities of less than or equal to about 30 parts by weight based on 100 parts of weight of polyphenylene ether resin and polystyrene resin.

Drip prevention agents such as those that prevent dripping during combustion, may also be utilized. Polytetrafluoroethylene is preferred as a drip prevention agent because of its ability to form fibrils in the composition. Other drip prevention agents, which can form fibrils, are also preferred. Drip prevention agents may be added in quantities of about 0.01 to about 5 parts by weight based on 100 parts of weight of polyphenylene ether resin and polystyrene resin. Within this range it is preferable to use the drip prevention agent in an amount of greater than or equal to about 0.05 by weight based on 100 parts of weight of polyphenylene ether resin and polystyrene resin. Within this range, it is also generally desirable to add the drip prevention agents in quantities of less than or equal to about 3 parts by weight based on 100 parts of weight of polyphenylene ether resin and polystyrene resin.

The polyphenylene ether resin and the polystyrene resin along with other desired additives may be melt blended and subsequently molded into a pipe. Melt blending operations are generally carried out in an extruder, ball mixer, roll mill, buss kneader and the like. During the melt blending operation, a small quantity of solvent may be added to the melt to facilitate processing if desired. During melt blending, the various components such as the polyphenylene ether, polystyrene and the other additives may be added simultaneously or sequentially if desired.

In one embodiment, in one manner of proceeding, the melt blending of the polyphenylene ether, polystyrene and other additives may be compounded in an extruder by adding the components simultaneously at the throat or sequentially through different feeders located at different positions along the barrel of the extruder. The extrudate emanating from the extruder may be either fed directly to a molding machine or cooled and converted into pellets, powder, and the like for use in a future molding operation.

The pipe may be molded from pellets, powder, and the like by methods such as injection molding, extrusion molding, blow molding, vacuum forming, and any other molding operations known in the art. Alternatively, the pipe may be molded by feeding the components such as the polyphenylene ether resin, polystyrene resin, and additives directly into the molding machine, where the components may be mixed immediately prior to molding. Both straight pipe sections as well as pipe joints may be molded, Extrusion molding is generally preferred for straight sections while injection molding is preferred for molding joints.

While pipe diameter, wall thicknesses, and shape may be chosen as desired, a preferred wall thickness is from about 2.0 to about 10 millimeters (mm). Pipe shapes may vary from cylindrical to quadrilateral to hexagonal, with cylindrical shapes generally being preferred.

Pipes made from the above composition may also be constructed in multi-layered or laminated form comprising at least two layers. Multilayered pipes may be constructed utilizing as many layers as may be desired so long as they are thermally stable and have water proof properties. When a pipe has two or more layers, it is desirable that at least one layer be constructed from the composition comprising polyphenylene ether resin and polystyrene resin.

Pipes made for water transmission and distribution, from the above-described composition display thermal stability, strength and ability to withstand high pressures in measures similar to PVC pipes without any of the drawbacks associated with PVC. For example, the outstanding thermal stability of the composition as reflected in a Vicat softening point test measured as per JIS K7206, is more than 80° C. Similarly a test plate cut from the pipe composition has a tensile strength greater than about 350 kgf/cm$^2$ at 15° C. and greater than about 120 kf/cm$^2$ at 90° C. Additionally because of its chemical stability, the pipe does not release any chlorine into the water and can he recycled for further use.

The excellent ability of the pipe composition to provide pipes that can withstand high pressures can be seen in the water pressure test and the internal pressure creep test where water leakage does not occur. Further no cracks and fissures were seen in the flatness test, which indicates the excellent pressure resistance characteristics of the composition. Pipes made from the above-described composition are also advantageous in that they do not contain components such as lead, which may be transmitted by the water. Further other detrimental factors such as increase in muddiness, color change, odor absorption, loss of taste, and the like, normally associated with steel pipes does not occur. Additionally, since the pipe does not contain any PVC, chlorine does not get into the water from the pipe. Because to the excellent thermal stability and chemical characteristics of the pipe composition, potassium permanganate normally used to purify drinking water may be used in lower quantities.

The present invention has been explained below in further detail with non-limiting examples. However, the present invention is not restricted to these practical examples.

EXAMPLES

The polyphenylene ether resin used in the examples was poly(2,6-dimethyl-1,4-phenylene)ether obtained from GE Plastics Co. (Japan) having an intrinsic viscosity of 0.46 dl/g when measured in chloroform at 25° C. TOPOLEX 870ST, a high impact polystyrene commercially available from Japan Polystyrene Co. Ltd, was also used. Triphenyl phosphate (TPP), commercially available from Daihatsu Chemical Industries Ltd. was used as a flame retarding agent. Adegastab MK2112, a phosphite stabilizer commercially available from Asahi Electro-Chemical Industries, was used as thermal stabilizer. Kraton G-1651, comprising hydrogenated styrene-butadiene copolymer commercially available from Shell Chemical Co., was used as the impact modifier.

Other additives such as NUC 6570, a denatured ethylene copolymer commercially available from Japan Uniker Co. Ltd was also used.

Table 1 shows the details of the composition. The composition was extruded using a biaxial extrusion-kneading machine with the barrel temperature set at about 270° C. to about 280° C. and a screw speed of 200 rpm. The extruded strand was the pelletized. The pellets were then extruded into a water distribution cylindrical pipe having external diameter of 32 mm, thickness of 3.5 mm and total length of 4 meters in a uniaxial extrusion machine. The extrusion conditions are shown in Table 2.

TABLE 1

| Composition | Practical example 1 | Practical example 2 | Practical example 3 | Comparative example |
|---|---|---|---|---|
| Polyphenylene ether resin (phr) | 44 | 57 | 30 | 36 |
| Polystyrene resin (phr) | 56 | 43 | 70 | 64 |
| Flame retardant (phr) | — | 5 | — | — |
| Impact modifier (phr) | — | — | — | 7 |
| Thermal Stabilizer (phr) | 0.1 | 0.1 | 0.1 | 0.1 |
| Others (phr) | — | — | — | 3 |
| Evaluation of molded product | | | | |
| Tensile strength (23° C.) (Kg/cm$^2$) | 540 | 570 | 480 | 440 |
| Tensile strength (23° C.) (Kg/cm$^2$) | 380 | 400 | 250 | 210 |
| Water pressure test (Visual judgment) | No water leakage | No water leakage | No water leakage | No water leakage |
| High temperature internal pressure creep test | No water leakage | No water leakage | No water leakage | No water leakage |
| Flatness test | Cracks absent | Cracks absent | Cracks absent | Cracks absent |
| Vicat softening temperature test (° C.) | 152 | 157 | 135 | 126 |
| Dissolution test Muddiness (passed if less than 0.5 degree) | Passed | Passed | Passed | Passed |
| Degree of color (passed if less than 1 degree) | Passed | Passed | Passed | Passed |
| Consumption of potassium permanganate* | Less than 2 mg | Less than 2 mg | Less than 2 mg | Less than 2 mg |
| Lead** | Less than 0.1 mg | Less than 0.1 mg | Less than 0.1 mg | Less than 0.1 mg |
| Reduced quantity of residual chlorine*** | Less than 1 mg | Less than 1 mg | Less than 1 mg | Less than 1 mg |
| Abnormal odor and taste | Absent | Absent | Absent | Absent |

*The test material passes the test if it has less than 2 mg of potassium permanganate.
**Lead is below the detection limit.
***The test material passes the test if it has a chlorine quantity of less than 1 ppm.

TABLE 2

| Molding temperature | | Practical example 1 | Practical example 2 | Practical example 3 | Comparative example 1 |
|---|---|---|---|---|---|
| Extrusion machine | Zone 1 | 190° C. | 230° C. | 215° C. | 200° C. |
| | Zone 2 | 200° C. | 240° C. | 225° C. | 210° C. |
| | Zone 3 | 210° C. | 250° C. | 235° C. | 220° C. |
| | Zone 4 | 220° C. | 260° C. | 245° C. | 230° C. |
| | Ad | 220° C. | 260° C. | 245° C. | 230° C. |

TABLE 2-continued

| Molding temperature | | Practical example 1 | Practical example 2 | Practical example 3 | Comparative example 1 |
|---|---|---|---|---|---|
| Die part | Die 1 | 220° C. | 260° C. | 245° C. | 230° C. |
| | Die 2 | 220° C. | 260° C. | 245° C. | 230° C. |
| | Die 3 | 220° C. | 260° C. | 245° C. | 230° C. |
| | Die 4 | 220° C. | 260° C. | 245° C. | 230° C. |
| Sizing part | Sizing former | 60° C. | 80° C. | 60° C. | 60° C. |
| Vacuum water tube | Water spray | Industrial water | Industrial water | Industrial water | Industrial water |

Tensile tests and thermal measurements were performed on the extruded pipe. Two sections of the extruded pipe as shown in FIG. 1 were tested for tensile strength as per JIS K6776. Thermal stability (V softening point temperature) was also measured as per JIS K7206 at a load of 5 kgf (49N). The test material having a length of 10 mm, breadth 10 mm, and thickness between 2.5 and 4.5 mm was cut from the pipe. Water pressure tests were measured on a test plate (cut from the pipe) having a length of more than 1000 mm as per JIS K6776 at a water pressure of 40 kgf/cm$^2$ (3.92 MPa) applied for a time period of 1 minute at room temperature. After the removal of pressure, the plate was visually examined for water leakage.

High temperature internal pressure creep tests were performed on a test plate having length of more than 500 mm (cut from the extruded pipe) as per JIS K6776. The test consists of subjecting the plate to a water pressure of 15 kgf/cm$^2$ (1.47 MPa) for 1 hour at 90±2° C. After the removal of pressure, the plate was visually examined for water leakage.

A flatness test was also performed wherein a circular test plate having a length of more than 50 mm was cut from the extruded pipe as per JIS K6776 and was sandwiched between 2 flat plates and it was compressed at right angles to the direction of the pipe axis at a speed of 10±2 mm per minute till the external diameter of the pipe is reduced in ½. The pipe was then visually examined for the presence of cracks and fissures.

Dissolution tests were performed on a section of pipe cut in a specific size as per JIS K6776. The pipe section was then washed with hot water having temperature of 90±2° C. for 1 hour. After this, one end was blocked with a plug containing polyethylene film after which the pipe section was filled with the test water. The test water comprised limewater added to refined water and the pH was regulated between 8.0 and 7.5 by passing $CO_2$ through the water. Chlorine was then added to the test water such that it contains approximately 2 ppm of free (liberated) residual chlorine following which the other end was plugged (corked) and it was kept undisturbed for 24 hours at normal temperature. After 24 hours, muddiness, degree of color, quantity of consumption of potassium permanganate, quantity of lead, reduced quantity of residual chlorine of the test water were evaluated as per the JIS K6776 appendix. Materials having the same to be less than 1.0 were taken as having passed the test. Smell and taste were evaluated as per functional tests.

As can be seen from the data of Table 1, the extruded pipe has excellent thermal stability and exhibits a good resistance to pressure. For example, it does not get damaged even if hot water having temperature in the vicinity of 80° C. is transmitted through it. The pipe displays an excellent balance of mechanical properties such as strength, impact resistance with thermal properties and chemical properties. It does not suffer from any damage to its dimensions, despite being subjected to the vagaries of the weather. Furthermore, impurities do not contaminate water transmitted through the pipe. This pipe can therefore be used as a substitute for polyvinyl chloride piping.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A heat resistant pipe formed from a composition comprising based on the total weight of the composition:
   about 5 to about 95 wt % polyphenylene ether resin;
   about 5 to about 95 wt % polystyrene resin; and
   an impact modifier selected from polyisoprenes, polybutadienes, polyacrylics, polyesters, acrylic acid-butadiene-styrene copolymers, and ethylene-propylene copolymers wherein the impact modifier is present at up to 7 wt %.

2. A heat resistant pipe formed from a composition consisting essentially of based on the total weight of the composition:
   about 5 to about 95 wt % polyphenylene ether resin;
   about 5 to about 95 wt % polystyrene resin; and
   an additive selected from the group consisting of fibrous fillers, non-fibrous filers, antistatic agents, ultraviolet absorbers, flame retardants, and mixtures thereof.

3. A method of forming a pipe, comprising:
   melt blending a composition comprising about 5 to about 95 wt % polyphenylene ether resin; about 5 to about 95 wt % polystyrene resin; and an impact modifier selected from polyisoprenes, polybutadienes, polyacrylics, polyesters, acrylic acid-butadiene-styrene copolymers, and ethylene-propylene copolymers; wherein the impact modifier is present at up to 7 weight percent; and
   molding the molt blend.

4. A method of forming a pipe, comprising:
   melt blending a composition consisting essentially of about 5 to about 95 wt % polyphenylene ether resin, about 5 to about 95 wt % polystyrene resin; and an additive selected from the group consisting of fibrous fillers, non-fibrous fillers, antistatic agents, ultraviolet absorbers, and mixtures thereof; and
   molding the melt blend.

5. The heat resistant pipe of claim 1, wherein the polyphenylene ether resin is selected from the group consisting of poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloromethyl-1,4-phenylene)ether, poly(2,6-dibromomethyl-1,4-phenylene)ether, poly(2,6-diphenyl-1,4-phenylene)ether, poly(2,6-ditolyl-1,4-phenylene)ether, poly(2,6-dichloro-1,4-phenylene)ether, poly(2,6-dibenzyl-1,4-phenylene)ether, poly(2,5-dimethyl-1,4-phenylene)ether, poly(2,6-dimethyl-1,4-phenylene-co-2,3,6-trimethyl-1,4-phenylene)ether, and combinations thereof.

6. The heat resistant pipe of claim 1, wherein the polystyrene resin is selected from the group consisting of homopolystyrene, high impact polystyrene, and syndiotactic polystyrene.

7. The heat resistant pipe of claim 1, wherein the polystyrene resin is syndiotactic polystyrene.

8. The heat resistant pipe of claim 1, wherein the polystyrene resin is recycled resin.

9. The heat resistant pipe of claim 1, wherein the composition further comprises a flame retardant.

10. The heat resistant pipe of claim 2, wherein the polyphenylene ether resin is selected from the group consisting of poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloromethyl-1,4-phenylene)ether, poly(2,6-dibromomethyl-1,4-phenylene)ether, poly(2,6-diphenyl-1,4-phenylene)ether, poly(2,6-ditolyl-1,4-phenylene)ether, poly(2,6-dichloro-1,4-phenylene)ether, poly(2,6-dibenzyl-1,4-phenylene)ether, poly(2,5-dimethyl-1,4-phenylene)ether, poly(2,6-dimethyl-1,4-phenylene-co-2,3,6-trimethyl-1,4-phenylene)ether, and combinations thereof.

11. The heat resistant pipe of claim 2, wherein the polystyrene resin is selected from the group consisting of homopolystyrene, high impact polystyrene, and syndiotactic polystyrene.

12. The heat resistant pipe of claim 2, wherein the polystyrene resin is syndiotactic polystyrene.

13. The heat resistant pipe of claim 2, wherein the polystyrene resin is recycled resin.

14. The heat resistant pipe of claim 2, wherein the composition further comprises an impact modifier selected from polyisoprenes, polybutadienes, polyacrylics, polyesters, acrylic acid-butadiene-styrene copolymers, a ethylene-propylene copolymers; wherein the impact modifier is present at up to 7 wt %.

15. The heat resistant pipe of claim 2,
   wherein the polyphenylene ether is poly(2,6-dimethyl-1,4-phenylene)ether, poly(2,6-di-ethyl-1,4-phenylene)ether, poly(2,6-dimethyl-1,4-phenylene-co-2,3,6-trimetheyl-1,4-phenylene)ether, or a combination thereof;
   wherein the polystyrene is syndiotactic polystyrene; and
   wherein the composition further comprises a flame retardant.

16. The method of forming a pipe of claim 3, wherein the melt blending is carried out in a melt blender selected from the group consisting of an extruder, buss kneader, roll mill, ball mill, and combinations comprising a least one of the foregoing melt blenders.

17. The method of forming a pipe of claim 3, wherein the molding is accomplished by injection molding, extrusion molding, blow molding, or vacuum forming.

18. The method of forming a pipe of claim 4, wherein the melt blending is carried out in a melt blender selected from the group consisting of an extruder, buss kneader, roll mill, ball mill, and combinations comprising at least one of the foregoing melt blenders.

19. The method of forming a pipe of claim 4, wherein the molding is accomplished by injection molding, extrusion molding, blow molding, or vacuum forming.

* * * * *